United States Patent [19]

Stocker

[11] Patent Number: 4,995,263

[45] Date of Patent: Feb. 26, 1991

[54] TUNING FORK QUARTZ MANOMETER

[75] Inventor: Rudolf Stocker, Azmoos, Switzerland

[73] Assignee: Balzers Aktiengesellschaft, Balzers, Liechtenstein

[21] Appl. No.: 450,857

[22] Filed: Dec. 14, 1989

[30] Foreign Application Priority Data

Jan. 23, 1989 [CH] Switzerland .................. 00204/89

[51] Int. Cl.$^5$ .............................................. G01L 11/00
[52] U.S. Cl. ........................................ 73/702; 73/708; 310/338; 310/370
[58] Field of Search ................... 73/702, 708, 384; 310/338, 370

[56] References Cited

U.S. PATENT DOCUMENTS

| | | | |
|---|---|---|---|
| 4,507,970 | 4/1985 | Dinger | 73/702 |
| 4,644,796 | 2/1987 | Ward | 73/702 |
| 4,747,311 | 5/1988 | Hojoh | 73/702 |

FOREIGN PATENT DOCUMENTS

| | | |
|---|---|---|
| 0180297 | 5/1986 | European Pat. Off. . |
| 0233054 | 8/1987 | European Pat. Off. . |

OTHER PUBLICATIONS

Design and Testing of a Quarty Friction Vacuum Gauge Using A Self–Oscillating Circuit by M. Hirata et al, 1987 American Vacuum Society, pp. 2393≧2396.
Frequency Dependence of a Quartz Oscillator on Gas Pressure by K. Kokubuin et al, Jun. 3, 1985; 2985 American Vacuum Soc.
Unified Formula Describing the Impedance Dependence of a Oscillator on Gas Pressure by K. Kokubun et al; Jan. 5, 1987; American Vacuum Society.

Primary Examiner—Donald O. Woodiel
Attorney, Agent, or Firm—Frishauf, Holtz, Goodman & Woodward

[57] ABSTRACT

The tuning fork quartz manometer has a tuning fork quartz (2) mounted in a protective casing (3) which is in turn part of a self-oscillating feedback circuit. According to the invention the protective casing (3) is inserted by means of a sealing compound (4) or directly into a hosing (5) of a measuring head (1,6) or a mounting support (15a, 20') so that the mounting support can in turn be inserted in the measuring head (1,6) and, as desired, an ideal rigid or elastic suspension is provided. A measuring circuit (20) is located directly in the measuring head close to the tuning gork quartz (2) and is thermally coupled to the latter. The measuring circuit (20) preferably has a temperature correction network ($R_1$, $R_2$, 22) high frequency coupled from the feedback circuit containing the tuning fork quartz.

17 Claims, 3 Drawing Sheets

TUNING FORK QUARTZ MANOMETER

Cross reference to relate applications, assigned to the assignee of this application: U.S. Ser. No. 07/452,112, filed Dec. 14, 1989, Stocker; U.S. Ser. No. 07/450,856, filed Dec. 14, 1989, Stocker et al.

FIELD OF THE INVENTION

The invention relates to a crystal manometer having a tuning fork quartz pressure gauge in a feedback circuit to provide for self-oscillation, in which the quartz is in a protective casing.

BACKGROUND

The use of quartz crystal or tuning fork quartz oscillators in gas friction manometers is known. Two measuring effects can be utilized for such applications because, as a function of the ambient pressure, such quartz oscillators can both have a frequency dependency and be subject to damping. For a good measurement accuracy in low pressure ranges (pressure<1 mbar) the damping of the oscillating quartz is preferably determined by measuring the resistance at resonant frequency, because the pressure-dependent change to the resonant frequency at low pressures is too small in order to permit reliable evaluation by measurement.

EP-A-No. 0 233 054 discloses a gas pressure sensor, which exposes a tuning fork quartz to the measuring environment. The aforementioned principle of the resistance measurement of a tuning fork quartz at resonant frequency is used. By means of a phase-coupled, electric oscillation system (PLL circuit) and an evaluation circuit, the change of resistance of the tuning fork is measured and appropriately indicated.

Although the corresponding measuring principle has been known for a considerable time, the practical use of such tuning fork quartz sensors has hitherto been restricted or made impossible by numerous different problems. A major problem in connection with this measuring method is that the measured damping value is not only dependent on the pressure, but also on the temperature. This is negligible at high pressures (>1 mbar). However, the desired measurement can be greatly impaired by the temperature dependence at lower pressures. In order to reduce the interference effects, a number of possibilities has been proposed. Thus, e.g. the apparatus according to EP-A-No. 0 233 054 uses a special, tailor-made oscillating quartz in order to keep the temperature influences as low as possible. It has also been proposed in connection with tuning fork quartzes to use a negative temperature coefficient, i.e. a NTC-resistor, which when connected in series brings about a temperature compensation (cf. EP-A-No. 0 180 297). Another possibility consists of thermostatically controlling the quartz (cf. Hirata M. et al, J. Vac.Sci.Technol., A5, 2393, 1987).

Another important problem results from the damping of the tuning fork quartz caused by the mounting support of the quartz. A poorly defined mounting support leads to imprecise or unreproducible measured values and only very limited power is converted in the said quartz. This makes the measurement very susceptible to error. The error may, particularly, result from the conditions in the measuring volume. Considerable significance is also attached to direct gas impacts acting on the quartz or contaminant or dirt particles, which make it necessary to appropriately position the quartz.

Use of a special quartz geometry, as proposed in EP-A-No. 0 233 054 can lead to an improvement in the measurement characteristics of the quartz, but does not satisfy the practical requirements. The use of such special quartzes also leads to higher manufacturing costs. It is desirable that standard tuning fork quartzes, such as are used as time-maintaining elements in watches and clocks, should be usable also in manometers.

Compensation of the temperature influences by means of a NTC-resistor connected in series with the quartz oscillator, as proposed in EP A-No. 0 180 297, only leads to inadequate results, because there are only a few degrees of freedom for the compensation and in particular higher order components remain uncompensated. Further, thermostatic control leads to very high, unacceptable costs. Thus, the proposals made up to now only lead to a very limited error or fault compensation, whilst at the same time being complicated and costly.

Account has not been taken in the conventional damping measurement circuits, e.g. that of U.S. Pat. No. 4,507,970 of the fact that the output valve, or quantity is substantially linearly dependent on the damping. In the case of vacuum measurement generally a constant relative precision is desired over the pressure range to be measured. In the case of conventional circuits when measuring low pressures very small damping and therefore output quantity changes have to be resolved. This leads to an additional high interference susceptibility at low pressures.

THE INVENTION

It is an object of the present invention to provide a tuning fork quartz manometer which, with relatively low design costs, low manufacturing costs and robust construction, permits a very high measuring precision, whilst substantially avoiding or compensating interference influences.

It is a further and important object of the invention to provide a measuring head for such a tuning fork quartz manometer which, at low pressures, avoids or adequately compensates for temperature effect on the quartz and ensures a clearly defined mounting of the quartz to reduce interference influences. The construction of the manometer should be compact and well shielded and prevent external interference influences of an electrical and mechanical nature, so that, already in the measuring circuit, the measuring sensitivity in the lower pressure range is enhanced when compared with that of a linear circuit.

Briefly, temperature compensation is obtained by providing a mounting support for the tuning fork quartz and for the circuit components to which the tuning fork quartz is connected; in one embodiment, the mounting support may be a portion of a measuring head. In accordance with a feature of the invention, the tuning fork quartz and the circuit components are thermally coupled together to be in good heat transferring relation, and physically located so close together that, for all practical purposes, any temperature changes which affect the tuning fork quartz will be reflected also in temperature changes at the circuit components.

The invention is based on a particularly advantageous arrangement of the quartz and the electrical circuit, a special design of the mounting support and other elements of the manometer, as well as an appropriate material selection. The arrangement of the components and the design of the electric circuit essentially avoid interference influences.

DRAWINGS

An embodiment of the invention is described in greater detail hereinafter relative to the drawings, which show:

FIG. 1: A front sectional view of the construction of a measuring head according to the invention.

Figure 2:
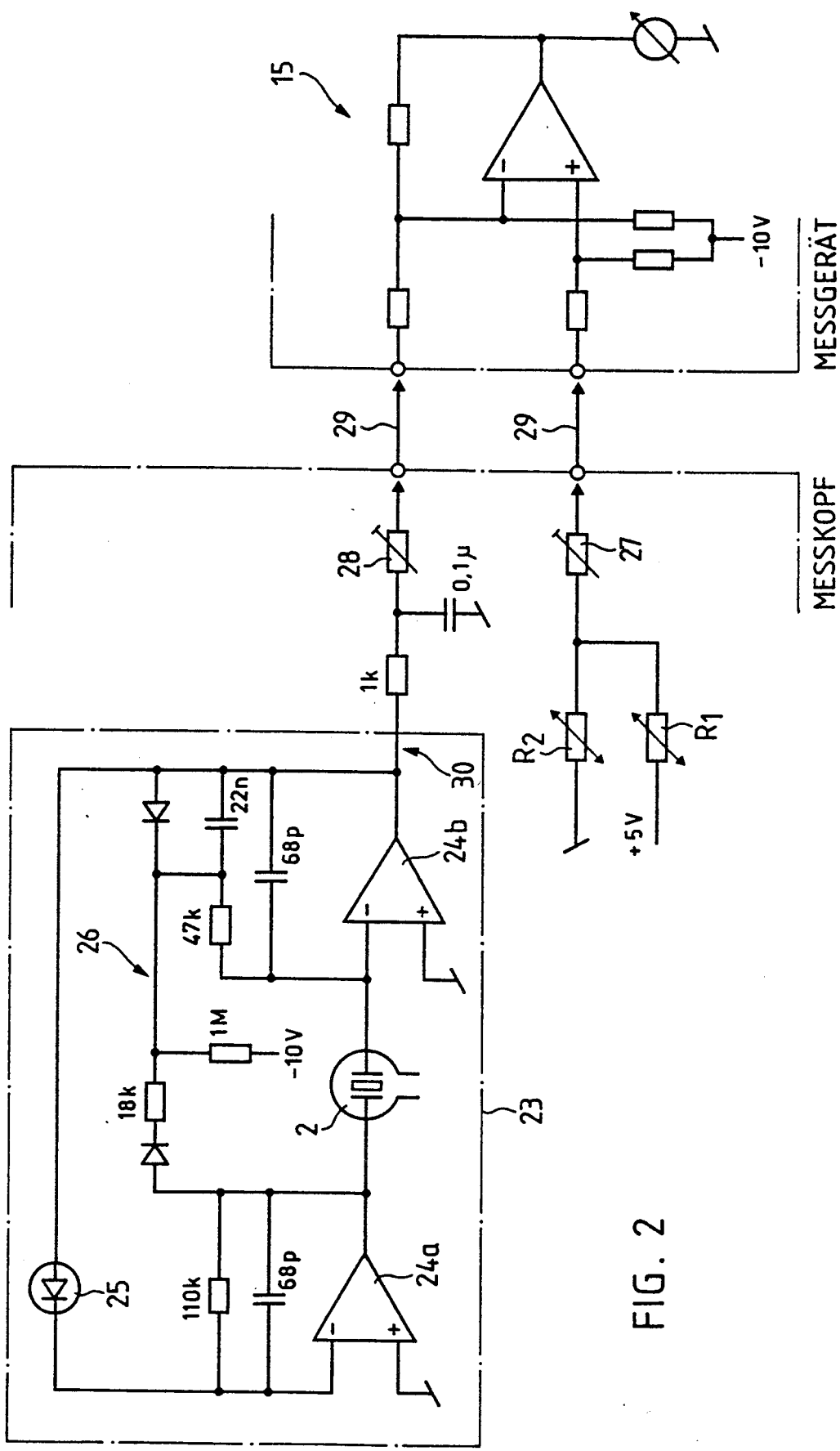

FIG. 2: A circuit diagram of the electrical/electronic measuring circuit.

Figure 3:
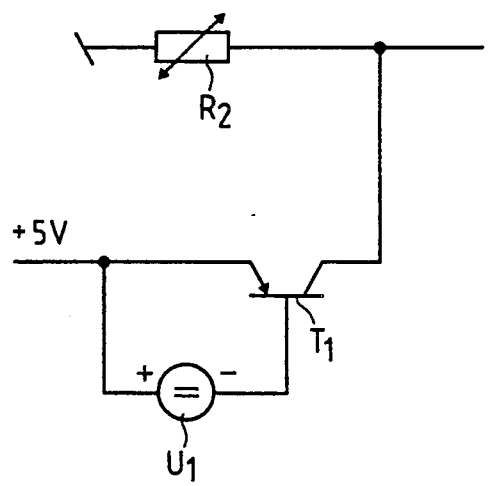

FIG. 3: A diagram of the temperature-compensating elements of the measuring circuit.

Figure 4:
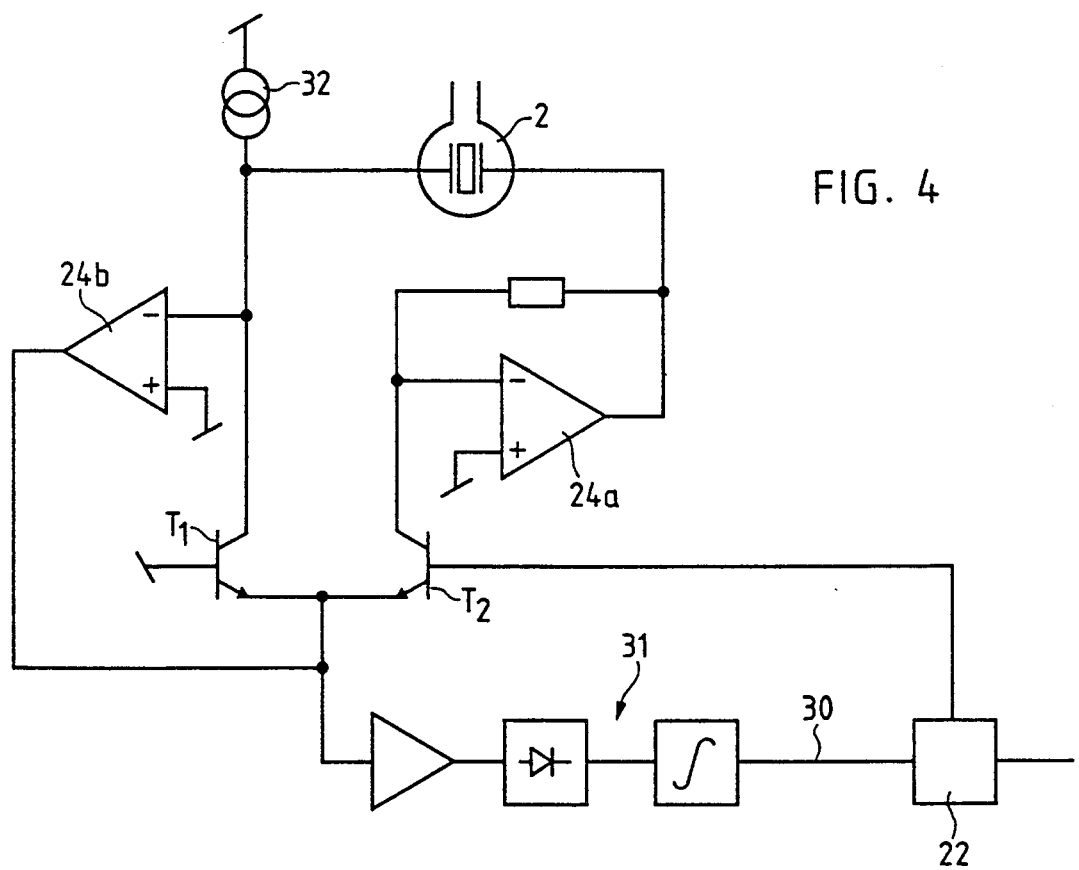

FIG. 4: A basic circuit diagram of the feedback circuit with transistors as the controllable element.

DETAILED DESCRIPTION

The hitherto proposed concepts for tuning fork manometers or pressure gauges are unable to avoid the disadvantages referred to hereinbefore. The reason for this is in particular that virtually no attention has been paid to the mounting of the quartz in previous research.

It has been found that the nature of the mounting of the quartz has a decisive influence on the oscillation energy of the quartz. Preference should be given to those mountings or mounting supports, which do not absorb the quartz oscillation energy, i.e. which constitute ideal rigid or ideal elastic mounting supports.

The low power conversion of quartz leads to problems if interference influences, e.g. HF discharges and plasma in the container (measuring volume) act on the quartz. Short connection lines between the quartz and measuring circuit and also a good shielding or screening effect are desirable.

On the basis of the above, it can be seen that in the case of tuning fork quartz manometers, maximum attention must be paid to the geometric and circuitry principles. However, little or no attention is paid to this in the prior art.

The invention is based on the discovery that the problems inherent in a tuning fork quartz can be avoided at source during the pressure measurement by physically incorporating the quartz into the measuring circuit or measuring head; thus interference influences can be largely eliminated prior to their acting on the quartz. For this purpose the electrical and mechanical concepts must be matched to one another. In other words, the electric circuit must be designed in such a way that the construction of the measuring head and the circuit are interrelated, mutually supporting features of the manometer.

Figure 1:
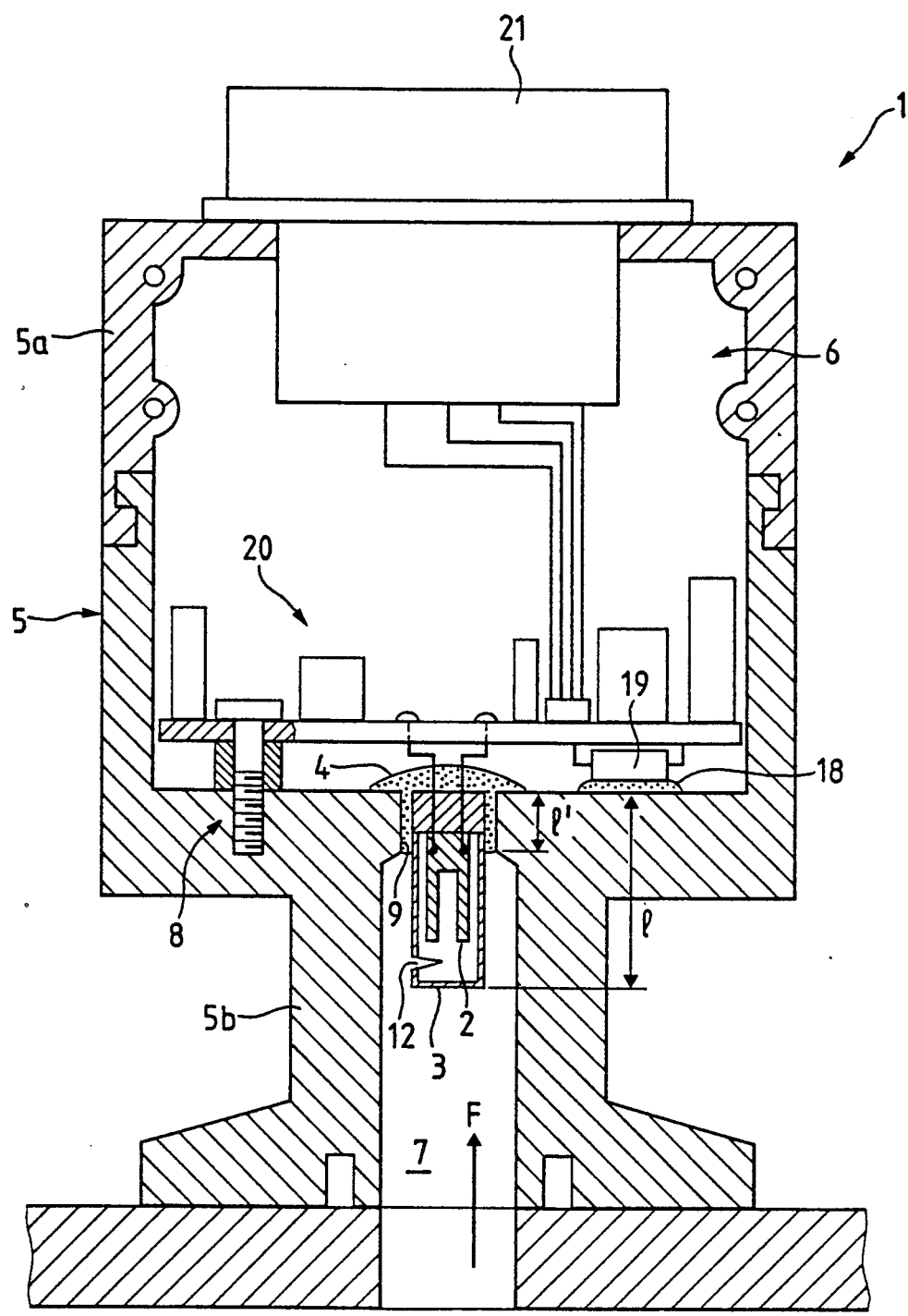
FIG. 1a is a fragmentary cross-sectional view of FIG. 1, showing a different embodiment of insertion of a tuning fork element.
FIG. 1b is a fragmentary view similar to FIG. 1a and showing another embodiment.

Referring to FIG. 1: Measuring head 1 has a housing or casing 5, which in one embodiment comprises two casing parts 5a, 5b and essentially surrounds a space or chamber 6 and a measuring space. Measuring space 7 is connected to a container 10 or to the measuring environment or to ambient space. The geometry and dimensions of the measuring head can vary. The casing part 5b is constructed as a measuring flange with the necessary casing wall thickness and surrounds the measuring space 7. The upper casing part 5a, which seals off the space 6, can be e.g. be made of plastic. Space 6 is under atmospheric pressure. In this embodiment the upper part of the casing has a diameter of approximately 3 cm. Space 6 contains an electric or electronic circuit 20 and is sealed against the measuring area 7. An opening 9 in the lower casing part 5b present prior to assembly is used for fitting the tuning fork quartz and is then sealed in a manner subsequently described. The tuning fork quartz 2 with its cylindrical protective casing 3 is inserted in opening 9. Great importance is attached to the way in which the protective casing is secured in opening 9, because as a result of suitable assembly two different advantages can be obtained. The wall thickness of the casing part 5b or the measuring flange, in the vicinity of the opening 9 is so selected, that the inserted protective casing 3 is connected to the casing part 5b over a predetermined length 1'. The connection between the protective casing 3 of the tuning fork quartz and the measuring flange is obtained by a sealing compound 4. This connection by means of sealing compound 4 is such that the measuring area 7 is tight with respect to the area 6, i.e. the pressure conditions in areas 6 and 7 are independent of one another.

With respect to the damping of the casing or the tuning fork quartz, it is possible to construct the connection to the measuring flange with a very large or a very small dynamic stiffness. For constructional reasons a high stiffness is preferably sought, e.g. by using an epoxy resin or solder. A relatively small dynamic stiffness can be obtained by a silicone connection. When choosing the material, it must be borne in mind that aggressive, corrosive or chemically reactive substances penetrate the measuring area and can therefore come into contact with the sealing compound, so that, basically, inert materials should be used for joining the protective casing and the measuring flange. Account must be taken when choosing the material of the aforementioned interference problem or problems as a result of thermal influences acting on the tuning fork quartz. The temperature fluctuations of the protective casing 3 and the tuning fork quartz 2 can be compensated in an optimum manner if as a result of an ideal thermal connection the measuring head can act as a large thermal sink or source. It is obviously advantageous if the measuring head, at least in the vicinity of the tuning fork quartz, has a good thermal conductivity. In this respect metal alloys are particularly suitable for use as the sealing compound 4 due to their high thermal conductivity. However, preference is given to plastics having a high thermal conductivity, because the electrical terminals of the oscillating quartz are passed through the sealing compounds 4. Apart from a suitable material selection, the stiffness can also be influenced by the geometry of the opening 9, the protective casing 3 and the sealing compound 4. In special embodiments the sealing compound 4 can also be constructed as an assembly element, e.g. as a pipe or tube section 4a (see FIG. 1a) connecting the protective casing 3 and the tuning fork quartz 2, or can form part of the casing part 5b. Such an assembly element can be sealingly fitted into the measuring flange. It is also possible to construct the protective casing 3 of the tuning fork quartz in such a way that it can be directly inserted in an opening of measuring flange 5b (see FIG. 1a) with a press fit in the measuring flange, which leads to good characteristics regarding the rigidity of the connection.

The small gap shown in the drawings embodiment between the protective casing 3 and the casing part 5b contributes to the high stiffness or a rigid connection between the measuring head and the tuning fork quartz. If a very rigid connection to the casing part 5b is sought, the protective casing 3 is rigidly fixed in opening 9 by sealing compound 4 with at least 1/10 of its total casing length 1. In the case of a protective casing diameter of approximately 3 mm and a length of 5 mm or more, this measure leads to a connecting length 1' of 2 to 3 mm, so that there is a very small quartz damping.

The protective casing 3 for the oscillating quartz surrounds the latter with the exception of an opening 12 and protects the quartz from contamination and pressure impacts in the measuring space 7. For this purpose opening 12 is arranged laterally on the protective casing, so that there is no direct line-of-sight opening from container or space 10 in the direction of arrow F and consequently no harmful pressure effects can be applied on the tuning fork quartz in the case of rapid pressure fluctuations.

In the measuring head, the measuring circuit 20 and its components is located directly above the tuning fork quartz 2 or its protective casing 3. The reason for this is the identical temperature conditions sought for the quartz and the measuring circuit and also the attaining of minimum connecting line lengths between the measuring circuit and the quartz. In addition the high frequency, i.e. h.f. circuit can be easily shielded against the space 10. As the quartz 2 only operates at very low power and only has very small power fluctuations, interference effects can have a great influence on measurement performances and can falsify the measurement. Particular difficulties result from the fact that e.g. during a coating process in a vacuum chamber, h.f.-discharges and plasma can be present in the container 10. The arrangement of the measuring circuit 20 immediately above the quartz casing 3 takes account of this. In order to achieve identical temperatures for measuring circuit 20 and quartz 2, the measuring circuit is secured with good heat conducting connections 8 to the measuring flange, i.e. on the same casing part 5b as the quartz 2 and as near as possible to the latter.

In the most favourable case the heat conducting connections 8 and the sealing compound 4 lead to an identical temperature pattern or variation of measuring circuit 20 and quartz 2. By a suitable material selection and arrangement of the assembly elements and components, it is possible to optimize the heat transfer connections, or heat bridges provided between the measuring circuit and the tuning fork quartz, which in the present case are formed by the sealing compound 4, the casing part 5b and the connections 8 and in this way temperature differences between them are avoided. Thus, the temperature relevant components (electrical and mechanical) are largely kept in thermodynamic equilibrium. The construction of the measuring head as described, in accordance with the invention, largely avoids damping and temperature-caused errors as well as any disturbing or interfering influences occurring in the container 10. This forms the basis for the electrical design of the measuring circuit. Elements of the measuring circuit exerting temperature-compensating influences, or which undergo temperature influences are preferably arranged directly over the quartz 2 and provided with a special thermal bridge 18. In the present embodiment the measuring circuit 20 components are placed on a printed circuit board 20 and a temperature compensating component or element 19 is provided on its underside. As a result of the heat conducting connection 18, there is an optimum temperature coupling of element 19 to the tuning fork quartz. A temperature coupling is understood to mean a connection by means of a material with a high thermal conductivity, i.e. a good heat conductor.

As can be gathered from FIG. 1, the present embodiment essentially has two heat bridges 8, 18. In order to increase the thermal conductivity, several such heat conducting connections can be provided or the circuit can be directly connected to a heat conducting body or cast or mounted therein. This body can in turn be part of the lower casing part 5b or can be connected in large-area manner thereto.

FIG. 2 is a circuit diagram of an embodiment of the measuring circuit. The detailed construction thereof can be readily gathered therefrom, so that only the principle of its function and operation need be explained hereinafter. The basic circuit 23 comprises a self-oscillating feedback circuit. Compared with non-self-oscillating circuits, the advantage is obtained that reduced circuitry expenditure is involved. For example, it is also possible to use a phase-locked loop, or PLL circuit, but this would lead to problems linked with transient oscillations and stabilization. As can be gathered from FIG. 2, the tuning fork quartz 2 is connected between two operational amplifiers 24a, 24b. The output of the second operational amplifier is supplied via a feedback path to one input of the first operational amplifier. This feedback path contains a capacitance diode 25, whose bias is controlled across a control loop 26. In place of a capacitance diode, it would be possible to use one or more transistors or other control elements (cf. FIG. 4). As a result of the control, the gain across the feedback circuit in the case of a resonant frequency of the tuning fork quartz is precisely equal to 1. The necessary control voltage is used as the measured quantity for the pressure fluctuations. It is supplied across a terminal 30 via terminal 29 to a corresponding evaluating circuit or a measuring instrument 15 for display. The advantage of using this control voltage is that the capacitance diode or transistor has a logarithmating effect on the measurement signal and therefore an increased sensitivity can be obtained in the low pressure range. For setting the zero point (HV-value, i.e. adjusting to the series resistance of the quartz at high vacuum) and the sensitivity (atmospheric. value; adjusting the measuring scale for the pressure range to be measured) two regulators, e.g. potentiometers 27, 28 are provided. Connections 29 and 29' are provided for connecting the measuring instrument 15 or an evaluating circuit.

The resistor $R_1$ is a temperature-dependent resistor with a marked negative temperature coefficient (NTC-resistor): $R_1 = R_{1o} \cdot e^{B/T}$. It is clear that according to the invention the NTC-resistor is removed from the self-oscillating circuit and is therefore not subject to the action of the high frequency oscillation of the quartz (e.g. 30 kHz). This NTC-resistor $R_1$ is used for determining the temperature through the measuring circuit, in that the changes to the internal resistance of the oscillating quartz caused by temperature fluctuations are compensated in circuitry manner. The NTC-resistor is connected in such a way that the quadratic term of the errors caused by temperature fluctuations is approximately compensated. By means of an additional circuit element $R_2$, it is also possible to compensate the linear errors of the HV-value. In this example, $R_2$ is a metallic resistor with a weak positive temperature coefficient: $R_2 = R_{2o} \cdot (1 + \alpha t)$. Both $R_1$ and $R_2$ are in thermal contact with the tuning fork quartz 2. The h.f. decoupling of the NTC-resistor permits an optimum thermal positioning of the latter without problems being caused by long line portions. The temperature-dependent resistors $R_1$ and $R_2$, forming a voltage divider, are connected separately via terminal 29' to the evaluation circuit 15.

FIG. 3 is an example of a circuit group, which can be used in place of the two resistors $R_1$ and $R_2$ and used for temperature compensation purposes. $R_2$ is a resistor as in the embodiment according to FIG. 2. In place of $R_1$ use is made of a transistor and a d.c. voltage source $U_1$. Once again $R_2$ and $T_1$ are in thermal contact with the tuning fork quartz.

The design of the measuring head and the measuring principle inter alia mean that the h.f. circuit is completely located in the measuring head and has short lines and a limited error susceptibility. The circuit in the measuring head is small, stable and inexpensive to manufacture, whilst being adjustable and therefore allows a replacement of the measuring heads. It is possible to compensate for temperature influences without any thermal stabilizing of the quartz being necessary.

FIG. 1 also shows a connector 21 for connections and terminals for an external measuring instrument. Obviously in the vicinity of said connector or in area 6, there could be other circuit elements for the measuring circuit, e.g. control and adjusting elements, together with connections 29 (FIG. 2) which must be accessible from the outside.

FIG. 4 illustrates another embodiment of the feedback circuit using transistors as the controllable element. Once again the quartz 2 is connected between two operational amplifiers 24a, 24b. A power source 32 suppies the necessary current to set the circuit operating point. Two transistors $T_1$, $T_2$ are connected in the feedback path and form the controllable circuit element. Control e.g. takes place by means of a PI-regulator 31, the control voltage taken via an output 30 being used as the measured quantity or damping signal. The advantage of this circuit is that a very good and clearly defined logarithmic dependence of the damping signal on the series resistance of the quartz is obtained, i.e. the damping signal will be proportional to log $R_{quartz}$. Compared with capacitance diodes, whose characteristics are subject to variations resulting from manufacture, the solution with transistors offers the advantage that, for physical reasons, their characteristics have a good logarithmic, clearly defined pattern. As can be gathered from the drawing, the damping signal is supplied to a temperature correcting network 22 and available as a temperature corrected signal at terminal 30'.

The use of a measuring circuit with a feedback circuit having an oscillating quartz and a separate temperature correction network, which is thermally coupled to the oscillating quartz, makes it possible to position the measuring circuit without long lines subject to high frequency action.

For special uses, it is possible to incorporate additional electric/electronic circuits or circuit elements in the measuring head, or to connect them to the measuring circuit 20 via terminal connector 21. The measuring circuit described relative to FIG. 2 can be otherwise varied according to the invention, without leaving the principle of the invention.

It is important that the circuit contains elements for compensating errors caused by temperature fluctuations and which remain despite the described construction of the measuring head. Such temperature error compensation elements are connected via heat bridges in as close to ideal contact with the oscillating quartz as possible and have a constant temperature change pattern with respect to the latter. It is also important to remove these temperature-compensating elements from the h.f. circuit, thus reducing problems concerning line lengths, shielding, and losses. Temperature fluctuations can be minimized by appropriately arranging these elements on the measuring head.

In the represented embodiment, the tuning fork quartz 2 and measuring circuit 3 are connected in heat conducting manner with casing part 5b. As stated hereinbefore, in this way the casing can act in temperature-equalizing manner on these elements. For special uses, particularly if the measuring head is to be used in an environment with frequent temperature fluctuations, such a thermal contact with the casing can have a disadvantageous influence. In such cases the measuring circuit 3 and tuning fork quartz 2, which are interconnected via a heat bridge, can be inserted in heat insulating manner in the casing. For this purpose it is e.g. possible to provide a common mounting support, which can e.g. form the partition between area 6 and measuring area 7. Thus, these components are independent of temperature fluctuations influencing the outside of the casing 5, whilst maintaining the objective of a thermal coupling of the tuning fork quartz and the measuring circuit.

As the measuring probe, without additional measures, leads to a high precision, it is particularly suitable for economic use in conjunction with measuring processes as described in patent applications Ser. Nos. 07/452,112 and 07/450,856 and with these can lead to an even greater measurement precision.

What is claimed is:

1. Turning fork manometer having
    a measuring head (1) including
        a tuning fork quartz (2);
        a self-oscillating feedback circuit (23) having circuit components (19, 20), said tuning fork quartz (2) being connected in said circuit; and
        a protective casing (3) surrounding the turning fork quartz,
    wherein the measuring head comprises
        a mounting support for retaining said tuning fork quartz (2) and said protective casing (3) in position and, further, for mounting said circuit components; and
    wherein said tuning fork quartz and said circuit components are secured to said mounting support and thermally coupled together in heat transferring relation, and said circuit components and said tuning fork quartz are physically located close to each other to minimize connecting line lengths and enhance said thermal coupling.

2. The manometer of claim 1, wherein said measuring head (1) comprises a structure (5, 5a, 5b) defining a measuring chamber (6) therein; and
    wherein said protective casing (3) surrounding said tuning fork quartz (2) is inserted into and through a wall (5b) of said measuring chamber to extend outwardly of said measuring chamber (6).

3. The manometer of claim 2, further including a sealing compound (4) interposed between said protective casing (3) and said wall (5b) of the structure (5, 5a, 5b) for sealing said protective casing, and hence said tuning fork quartz into said wall (5b).

4. The manometer of claim 3, wherein the sealing compound (4) comprises a material of high thermal conductivity.

5. The manometer of claim 1, wherein said measuring head (1) comprises a measuring structure (5, 5a, 5b) defining therein a measuring chamber (6); and wherein said mounting support comprises a wall (5b) of said structure.

6. The manometer of claim 1, including a circuit support (20') for said circuit components (19, 20);

heat bridge couplings (8, 18) coupling said mounting support and said circuit support to form a good heat conductive connection between said circuit components and said mounting support; and wherein said protective casing (3) and said tuning fork quartz (2) are secured to said mounting support (5b).

7. The manometer of claim 1 further including a measuring structure (5, 5a, 5b) defining a measuring chamber (6);

wherein said mounting support includes a circuit support (20') positioned within said measuring chamber thermally insulated from said measuring structure;

and thermal coupling connections (8, 18) extending between a wall (5b) between said circuit components on the circuit support and said tuning fork quartz.

8. The manometer of claim 1, wherein said protective casing (3) comprising essentially tubular element securely connected over at least one-tenth of its length (1) to said mounting support.

9. The manometer of claim 1, wherein said measuring circuit includes at least one temperature-dependent element (19, $R_1$, $R_2$, $T_1$, $U_1$) which is thermally coupled to said tuning fork quartz.

10. The manometer of claim 9, wherein said measuring circuit comprises a high-frequency oscillating circuit and a temperature correction network;

and wherein said temperature correction network comprises at last one temperature-dependent element, and said temperature correction network is high-frequency decoupled from said oscillating circuit.

11. The manometer of claim 9, including a measuring circuit comprising at least one temperature-dependent element ($R_1$, $R_2$, $T_1$, $U_1$), which at least one temperature-dependent element is thermally coupled to said tuning fork quartz;

wherein said self-oscillating feedback circuit has a first output terminal (29), said at least one temperature-dependent element has a second output terminal (29')

and an evaluation or indicating or measuring instrument circuit (15) is provided, connected to both said first and second output terminals.

12. The manometer of claim 1, wherein said oscillating feedback circuit includes a capacitance diode (25), and means (26) for controlling the bias of said capacitance diode, to control the feedback effect thereof.

13. A method for measuring pressure, comprising providing a tuning fork quartz manometer as claimed in claim 12, including the steps of controlling the bias of the capacitance diode such that the gain of of said oscillating feedback circuit (23) will be approximately 1;

deriving an output voltage from said feedback circuit at an output terminal (30, 29) as a pressure-dependent measurement quantity or value; and indicating or displaying said pressure-dependent as a measured quantity calibrated in pressure units.

14. The manometer of claim 1, wherein said oscillating feedback circuit comprises at least one transistor ($T_1$, $T_2$), and means (31) for controlling the operation of said at least one transistor.

15. A method for measuring pressure, comprising providing a tuning fork quartz manometer as claimed in claim 13, including the steps of controlling said at least one transistor ($T_1$, $T_2$) across a control loop such that the gain of said oscillating feedback circuit (23) at resonant frequency of said tuning fork quartz (2) is at least approximately equal to 1;

deriving a measuring voltage as a pressure-dependent measured quantity or value at an output terminal (30, 30'); and indicating or displaying said measured quantity or value calibrated in pressure units.

16. The manometer of claim 1, further including a tube or pipe element (4a) interposed between said protective casing (3) of the tuning fork quartz (2) and said mounting support (5, 5b) for sealingly retaining said protective casing in the mounting support while providing for thermal coupling and heat transfer between said casing and said mounting support.

17. The manometer of claim 1, wherein said mounting support (5 5b) is formed with an opening matching the outer dimension and shape of said casing (3) of said tuning fork quartz (2); and said casing (3) of the tuning fork quartz is inserted in said opening and directly seated therein for mounting said tuning fork quartz directly in said casing for secure attachment and heat transfer between said casing of the tuning fork quartz and said mounting support (5 5b).

* * * * *